(12) United States Patent
Sano et al.

(10) Patent No.: US 8,024,070 B2
(45) Date of Patent: Sep. 20, 2011

(54) PASSIVE WALKING LEGGED ROBOT

(75) Inventors: Akihito Sano, Nagoya (JP); Hideo Fujimoto, Nagoya (JP); Yoshito Ikemata, Nagoya (JP)

(73) Assignee: Nagoya Institute of Technology, Nagoya-Shi (JP)

( * ) Notice: Subject to any disclaimer, the term of this patent is extended or adjusted under 35 U.S.C. 154(b) by 919 days.

(21) Appl. No.: 11/921,789

(22) PCT Filed: Jun. 8, 2006

(86) PCT No.: PCT/JP2006/311552
§ 371 (c)(1),
(2), (4) Date: Dec. 7, 2007

(87) PCT Pub. No.: WO2006/132330
PCT Pub. Date: Dec. 14, 2006

(65) Prior Publication Data
US 2009/0055021 A1 Feb. 26, 2009

(30) Foreign Application Priority Data
Jun. 8, 2005 (JP) ................................. 2005-168905

(51) Int. Cl.
*G05B 19/18* (2006.01)
(52) U.S. Cl. ........ 700/254; 700/245; 700/246; 700/247; 700/249; 700/250; 318/568.1; 318/568.2; 318/568.11; 318/568.15; 318/568.16; 901/1; 901/2; 901/9; 901/23; 901/33; 701/23
(58) Field of Classification Search .................. 700/245, 700/246, 247, 249, 250, 251, 252, 253, 254, 700/258, 260, 261, 262, 264; 318/568.1, 318/568.2, 568.11, 568.12, 568.15, 568.16, 318/568.17, 568.22; 901/1, 2, 9, 23, 33, 901/46, 47, 48, 50; 180/8.1, 8.6; 74/490.04; 52/69, 117; 173/28; 701/23
See application file for complete search history.

(56) References Cited

U.S. PATENT DOCUMENTS
6,243,623 B1 * 6/2001 Takenaka et al. ............. 700/245
(Continued)

FOREIGN PATENT DOCUMENTS
JP          A-05-337849          12/1993
(Continued)

OTHER PUBLICATIONS
McGeer; "Passing Dynamic Walking;" *The International Journal of Robotics Research*; vol. 9; No. 2; Apr. 1990.
(Continued)

*Primary Examiner* — James P Trammell
*Assistant Examiner* — McDieunel Marc
(74) *Attorney, Agent, or Firm* — Oliff & Berridge, PLC

(57) ABSTRACT

The present disclosure provides a fixed point stabilization device for a legged mobile body having a generating mechanism for generating a fixed point. The present disclosure also provides a fixed point stabilization device for a legged mobile body comprising a stabilizing device for stabilizing the fixed point in accordance with a leg grounding position of the legged mobile body. The fixed point is generated by inputting a predetermined constant torque to a joint of a leg of the legged mobile body on the basis of the energy balance in the legged mobile body, leg switching, and a leg swinging motion. The fixed point is stabilized globally by keeping the leg grounding position of the legged mobile body constant using a stopper.

2 Claims, 2 Drawing Sheets

U.S. PATENT DOCUMENTS

| | | | |
|---|---|---|---|
| 6,289,265 B1 * | 9/2001 | Takenaka et al. | 700/245 |
| 6,876,903 B2 * | 4/2005 | Takenaka | 700/245 |
| 6,920,374 B2 * | 7/2005 | Takenaka et al. | 700/245 |
| 6,922,609 B2 * | 7/2005 | Takenaka et al. | 700/245 |
| 7,598,695 B2 * | 10/2009 | Takanishi et al. | 318/568.12 |
| 2003/0114960 A1 * | 6/2003 | Takenaka et al. | 700/245 |
| 2004/0139695 A1 * | 7/2004 | Monti | 53/264 |
| 2006/0122731 A1 * | 6/2006 | Takenaka et al. | 700/245 |
| 2009/0200090 A1 * | 8/2009 | Takanishi et al. | 180/8.6 |

FOREIGN PATENT DOCUMENTS

| | | |
|---|---|---|
| JP | B-3269852 | 4/2002 |
| JP | A-2003-080478 | 3/2003 |
| JP | A-2005-088113 | 4/2005 |
| JP | A-2005-096068 | 4/2005 |
| JP | A-2006-116672 | 5/2006 |
| JP | A-2006-142465 | 6/2006 |
| WO | WO 03/090982 A1 | 11/2003 |
| WO | WO 2006/132330 A1 | 12/2006 |

OTHER PUBLICATIONS

Collins et al.; "A Bipedal Walking Robot with Efficient and Human-Like Gait;" Proceedings of the 2005 IEEE, International Conference on Robotics and Automation, Barcelona, Spain: pp. 1983-1988; Apr. 2005.

Collins et al.; "Efficient Bipedal Robots Based on Passive-Dynamic Walkers;" www.sciencemag.org; Science; vol. 307; pp. 1082-1085; Feb. 18, 2005.

Ikemata et al.; "Analysis of fixed point and its stable structure in passive walking from difference equation;" Japan Society of Mechanical Engineers; Collection of Papers; Conference on Robotics Mechatronics; vol. 2004; pp. 257-265; Jun. 18-20, 2004.

Yamakita et al.; "Chaos Dynamics of Biped Passive Walking and the Evaluation by an Actual Robot;" Japan Society of Mechanical Engineers; Collection of Papers; vol. 71; No. 705; pp. 1669-1677; May 25, 2005.

* cited by examiner

PASSIVE WALKING LEGGED ROBOT

TECHNICAL FIELD

The present application claims priority on the basis of Japanese Patent Application No. 2005-168905, filed on Jun. 8, 2005, the entire contents of which are hereby incorporated in this specification by reference.

The present invention relates to a passive walking legged robot.

BACKGROUND ART

Patent Document 1 and so on are known as examples of attitude stabilization control for a legged mobile robot, in particular a bipedal walking legged mobile robot employing Zero Moment Point (ZMP). Further, Non-Patent Document 1 provides detail with respect to stabilization of the fixed point of a legged mobile body, in particular a passive walker.

Conventional legged mobile robots stand at the forefront of technologies including high-precision sensors, high-performance actuators, and advanced control. The keystone of the technologies is ZMP. A walking control method employing ZMP focuses on trajectory planning and control (including measurement) of ZMP.

Meanwhile, the gait known as passive walking, cannot be ignored, and always generates a great deal of interest in terms of the possibility of engineering applications. A feature of passive dynamic walking is that a natural gait can be produced by the interaction between the dynamics of the legged mobile body and the environment (a downward slope) with no control whatsoever.

Patent Document 1: Japanese Patent No. 3269852
Non-Patent Document 1: T. McGeer, "Passive Dynamic Walking", The Int. J. of Robotics Research, vol. 9, no. 2, pp. 62-82, 1990

DISCLOSURE OF THE INVENTION

ZMP is an important mechanical index relating to attitude stabilization not only during walking, and is the most powerful tool for enabling walking without falling. However, with attitude stabilization control employing ZMP, it is difficult in principal to realize a highly energy-efficient gait. Moreover, the resulting gait feels unnatural compared to passive walking.

In passive walking, the resolution of a nonlinear leg swinging motion jumps discontinuously due to the leg switching phenomenon. A cyclic trajectory is generated from this type of hybrid system. When the trajectory forms a limit cycle, the state immediately after grounding is fixed as the fixed point. With conventional passive walking, however, a stable fixed point does not exist when walking uphill and along level ground, and therefore a steady gait cannot be achieved. Moreover, the robustness of passive walking is low, and stable continuous walking is difficult. Furthermore, convergence on the fixed point is poor.

It is therefore an object of the present invention to provide a passive walking legged robot that is capable of stabilizing a fixed point.

A passive walking legged robot according to the present invention comprises two outside legs, a single central leg, and a stopper. The two outside legs are connected rotatably and coaxially to a waist. The central leg is connected between the two outside legs rotatably and coaxially to the two outside legs. The stopper is connected to the two outside legs and formed in a loop shape surrounding the central leg.

In this specification, the stopper may be referred to as a fixed point stabilization device or stabilizing means. Further, the passive walking legged robot may be referred to as a legged mobile body.

The fixed point stabilization device (stopper) preferably generates the fixed point from an energy balance in the passive walking legged robot, leg switching, and a leg swinging motion.

Further, the stabilizing means (stopper) stabilize the fixed point globally by keeping the leg grounding position of the passive walking legged robot constant or substantially constant.

Furthermore, the stabilizing means preferably stabilize the fixed point locally by varying the leg grounding position of the passive walking legged robot in accordance with a deviation between the fixed point and a current quantity of state.

According to the present invention, a fixed point can be generated, on level ground or uphill, simply by inputting a constant torque at each step period based on a mechanical structure of a fixed point formed from an energy balance, leg switching, and a leg swinging motion. As a result, a natural and highly energy-efficient gait can be realized.

By keeping the grounding position of the leg constant or substantially constant, the fixed point can be stabilized globally, enabling extremely stable continuous walking. Moreover, robustness increases dramatically.

Finite setting is performed through local stabilization of the fixed point, and as a result, the fixed point converges to a substantially steady state in a few steps.

BEST MODE FOR CARRYING OUT THE INVENTION

A preferred embodiment of a fixed point stabilization device for a legged mobile body according to the present invention will be described below.

A generating mechanism for generating a fixed point, which is provided in the fixed point stabilization device for a legged mobile body according to the present invention, is capable of calculating a fixed point directly, without searching for a fixed point numerically, from the energy balance in the legged mobile body, leg switching, and a leg swinging motion. Hence, by varying the energy balance and the leg switching and leg swinging motions, a fixed point can be created as desired. For example, a fixed point is preferably calculated from an energy balance formula, a leg switching formula, and a leg swinging formula, whereupon a fixed torque required to generate the fixed point is generated in the joints of the legged mobile body.

In the fixed point stabilization device for a legged mobile body according to the present invention, the most important feature of the stabilizing means is to keep the leg grounding position of the legged mobile body constant or substantially constant in order to stabilize the fixed point globally. Keeping the leg grounding position constant or substantially constant is preferably realized actively by a servo mechanism employing an actuator, or more preferably realized passively employing a passive element. Attaching a stopper to the legged mobile body, for example, is simple and reliable.

Further, by varying the leg grounding position of the legged mobile body in accordance with a deviation between the fixed point and the current quantity of state, the fixed point is stabilized locally. The quantity of state is preferably taken as the state immediately before or immediately after grounding, and the leg is grounded in a grounding position that has been varied according to the deviation from the fixed point, preferably such that local (in the vicinity of the fixed point) stability in a discrete time system reaches a maximum.

EMBODIMENT

First Embodiment

Figure 1:
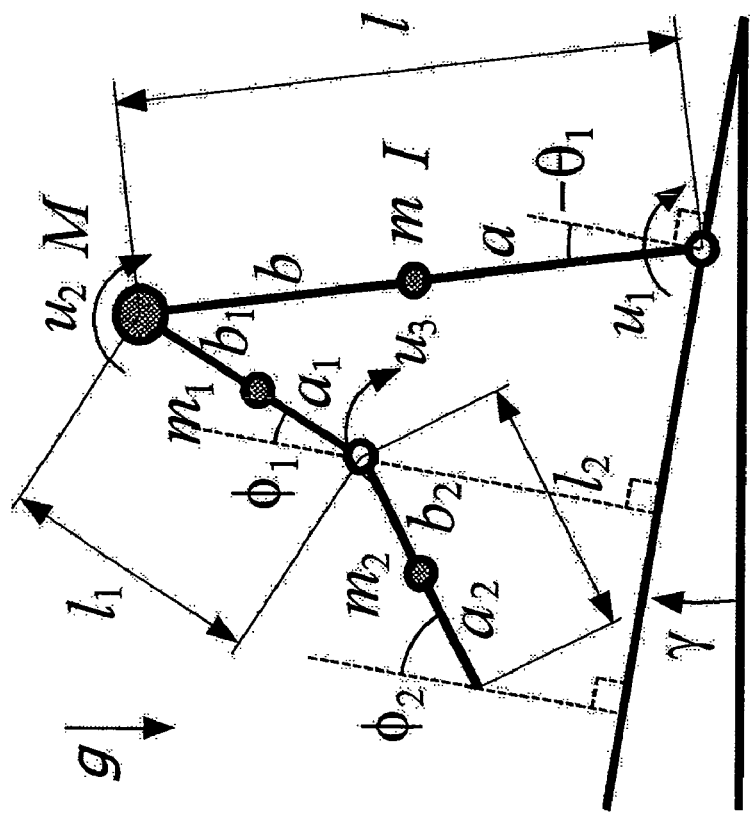
FIG. 1 is a schematic view showing a legged mobile body having a knee joint.

FIG. 1 schematically shows a legged mobile body having a knee joint. First, fixed point generation and local stabilization on level ground ($\gamma=0$ [rad]) will be described. In FIG. 1, $l=0.7$ [m], $l_1=l_2=0.35$ [m], $a_1=b_1=a_2=b_2=0.35$ [m], and $p=m_2/m_1=0.4$. The fixed point of the passive dynamic walking class corresponding to a slope angle of $\gamma=0.073$ [rad] is derived from a legged mobile body energy balance formula, a leg switching formula, and a leg swinging motion formula. The quantity of state at this time corresponds to an inter-leg angle $\alpha_f=0.73750$ [rad] immediately after grounding and the angular velocity of a stance leg $(d\theta/dt)|_f^+=1.35140$ [rad/s]. Note that in this embodiment, the knee joint of a swing leg is fixed at the point where the swing leg becomes straight and the knee joint of the stance leg extends straight, and therefore the inter-leg angle immediately after grounding is considered equivalent to the grounding position of the leg.

Joint torque vectors $\tau_K$, $\tau_C$ required to generate the fixed point are calculated from Formula 1 and Formula 2 and obtained as follows, $\tau_K = [0.50078, -0.275429, -0.125195][\text{Nm/kgm}^2]$ $\tau_C = [0.50078, -0.275429][\text{Nm/kgm}^2]$ Until the knee joint of the swing leg is fixed, $\tau_K$ is input, and after the knee joint is fixed, $\tau_C$ is input.

A coefficient is calculated from the inter-leg angle $\alpha_f$ at the fixed point, the angular velocity of the stance leg $(d\theta/dt)|_f^+$, and Formulae 3, 4 and 5, and obtained as follows, $a_f=0.002$ [1/s], $b_f=-0.8156$ [1/s], $c_f=0.5478$ Then, a rate of change in the inter-leg angle at the time of grounding as finite setting is calculated from Formulae 6 and 7, and obtained as follows, $(\delta\alpha_{k+1}/\delta\alpha_k)|_f=-0.54861$, $(\delta\alpha_{k+1}/\delta((d\theta/dt)|^+))|_f=0.36845$ [s]

Finally, when setting is performed to obtain the numerical value of $(\delta\alpha_{k+1}/\delta\alpha_k)|_f$, $(\delta\alpha_{k+1}/\delta((d\theta/dt)|^+))|_f$ at which the coefficient of Formula 8 is obtained, $K_\alpha=1.7582$, $K_{(d\theta/dt)}=-1.4508$ By controlling the leg grounding position (the inter-leg angle at the time of grounding) using Formula 8 in the vicinity of the fixed point, the fixed point can be locally stabilized.

Figure 2:
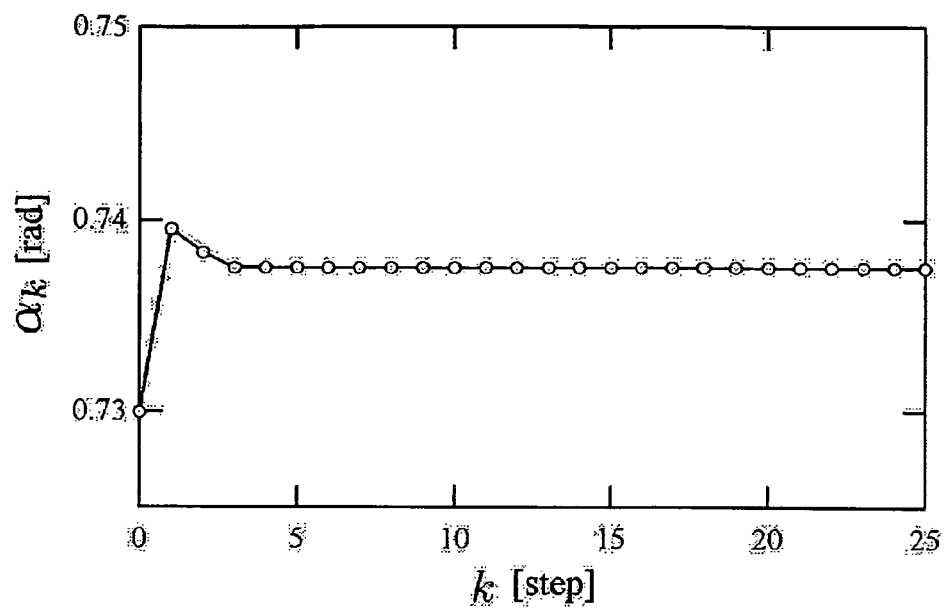
FIG. 2 is a view showing the results of a walking simulation.

FIG. 2 shows the results of a walking simulation. The abscissa and ordinate respectively show the number of steps and the inter-leg angle at the time of grounding. As is evident from the drawing, a fixed point (gait) is generated even on level ground and converges to a substantially steady state after three steps.

Figure 3:
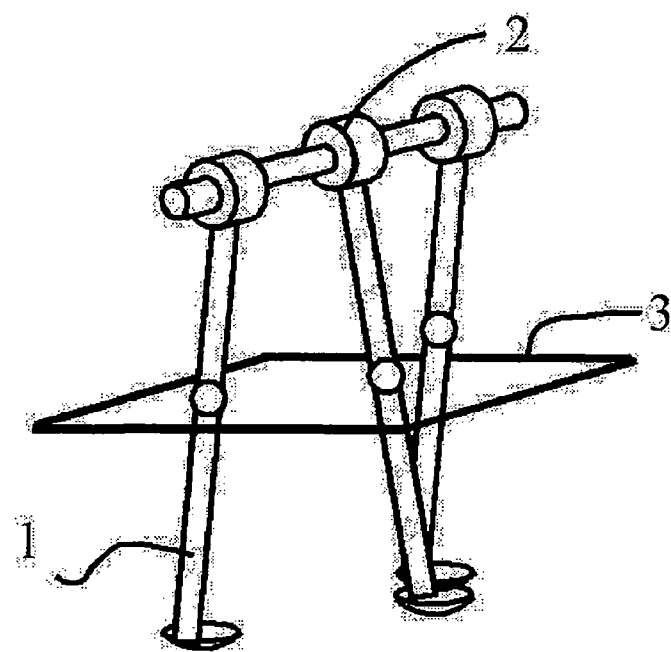
FIG. 3 is a schematic view showing the entirety of a legged mobile body employing the present invention.

FIG. 3 is a schematic view showing the legged mobile body employing this embodiment. A simple stopper such as that shown in FIG. 3 is attached in order to fix the leg grounding position (the inter-leg angle at the time of grounding) of the legged mobile body. Note that the stopper is not limited to this example. When the leg grounding position is not fixed (the stopper is not provided), continuous downhill walking for five paces or more is impossible. When the grounding position is fixed, on the other hand, continuous downhill walking for nine paces (the maximum number of possible steps) is achieved with a success rate of approximately 70[%]. Note that the experiment was conducted 350 times.

$$\tau_K = \begin{bmatrix} \tau_{1f} \\ \tau_{2f} \\ \tau_{3f} \end{bmatrix} = \begin{bmatrix} u_1/M \\ u_2/m_1 \\ u_3/m_2 \end{bmatrix} = \begin{bmatrix} l(\gamma'-\gamma) \\ -(b_1+pl_1+pb_2)(\gamma'-\gamma) \\ -b_2(\gamma'-\gamma) \end{bmatrix} g \quad \text{Formula 1}$$

$$\tau_C = \begin{bmatrix} \tau_{1f} \\ \tau_{2f} \end{bmatrix} = \begin{bmatrix} u_1/M \\ u_2/m_1 \end{bmatrix} = \begin{bmatrix} l(\gamma'-\gamma) \\ -(1+p)b(\gamma'-\gamma) \end{bmatrix} g \quad \text{Formula 2}$$

$$\alpha_f = \frac{1}{d_f}\frac{\partial e_f}{\partial \alpha_f}\left(\dot{\theta}_f^{+2} + \frac{4g}{l}\sin\frac{\alpha_f}{2}\sin\gamma + \frac{2\tau_{1k}\alpha_l}{l^2}\right) + e_f\frac{g}{2ld_f}\left(\sin\frac{\alpha_f}{2}\cos\gamma + \cos\frac{\alpha_f}{2}\sin\gamma\right) + e_f\frac{\tau_{1f}}{2l^2d_f} \quad \text{Formula 3}$$

Where $$d_f = \sqrt{\dot{\theta}_f^{+2} + \frac{4g}{l}\sin\frac{\alpha_f}{2}\sin\gamma + \frac{2\tau_{1k}\alpha_f}{l^2}}$$

$$e_f = \cos\alpha_f$$

$$b_f = e_f\frac{g}{2ld_f}\left(-\sin\frac{\alpha_f}{2}\cos\gamma + \cos\frac{\alpha_f}{2}\sin\gamma\right) + e_f\frac{\tau_{1f}}{2l^2d_f} \quad \text{Formula 4}$$

$$c_f = e_f\frac{\dot{\theta}_f^+}{d_f} \quad \text{Formula 5}$$

$$\left.\frac{\partial \alpha_{k+1}}{\partial \alpha_k}\right|_f = -\frac{b_fc_f}{b_f+a_fc_f} \quad \text{Formula 6}$$

$$\left.\frac{\partial \alpha_{k+1}}{\partial \dot{\theta}_k^+}\right|_f = -\frac{c_f^2}{b_f+a_fc_f} \quad \text{Formula 7}$$

$$\tau_{2k}=K_\alpha(\alpha_k-\alpha_f)+K_\theta(\dot{\theta}_k^+-\dot{\theta}_f^+)+\tau_{2f} \quad \text{Formula 8}$$

The meanings of the symbols in the above formulae and the drawings are as follows.

g: acceleration of gravity
$\gamma$: slope angle
$u_1$: ankle torque, $u_2$: hip torque, $u_3$: knee torque
$\tau_K$: joint torque vector of fixed point
$\tau_C$: joint torque vector of fixed point when locked at knee of swing leg extends straight $\tau_K$ and $\tau_C$ can be expressed as follows.

$\tau_K=[\tau_{1f},\tau_{2f},\tau_{3f}]=[u_1/M, u_2/m_1, u_3/m_2]$ $\tau_C=[\tau_{1f},\tau_{2f}]=[u_1/M, u_2/m_1]$ $\alpha_f$: the inter-leg angle at the time of grounding at fixed point
$e_f=\cos\alpha_f$: loss factor at the time of grounding
where $e_f^2$ denotes the energy survival rate when the legged mobile body collides with a floor surface.
$\gamma'$: control coefficient during fixed point generation
$K_\alpha$: control coefficient for stabilizing fixed point
$K_{(d\theta/dt)}$: control coefficient for stabilizing fixed point
d/dt: time differential (a symbol formed by attaching a dot to "$\theta$" also denotes the same time differential)
$\delta$: partial differential Superscript suffix "+": the value of a variable to which the suffix "+" is added immediately after grounding
Superscript suffix "−": the value of a variable to which the suffix "−" is added immediately before grounding
Subscript suffix "f": the value of a variable to which the suffix "f" is added at the fixed point
Subscript suffix "k": the value of a variable to which the suffix "k" is added at step "k" of walking
Subscript suffix "k+1": the value at step "k+1"

Further, "k" on the abscissa in FIG. 2 denotes step "k" of walking, and $\alpha k$ on the ordinate denotes the inter-leg angle at the time of grounding at step "k".

The term "fixed point" in this specification is defined as follows. A certain space (not only a physical space, but also a mathematical n-dimensional space) is assumed. A case in which an arbitrary plane (strictly mathematically speaking, an (n−1)-dimensional space) defined within the space has an intersection point with a trajectory realized within the space is assumed. When the plane and a closed cyclic trajectory have an intersection point, the intersection point is known as the "fixed point". When a state away from the fixed point converges on the fixed point, the fixed point corresponds to "stable", and when the fixed point is stable, the trajectory is mathematically proven to be "stable". Further, a trajectory having a stable fixed point is known as a stable limit cycle. The expressions "trajectory", "fixed point", and "stable" used above are typical mathematical expressions, and the basic concepts behind these expressions as used in this specification are identical to the concepts thereof when used mathematically.

In this specification, the "fixed point" is defined in relation to a trajectory drawn by a arbitrary point fixed on a leg of a legged mobile body during walking. The arbitrary point is referred to hereafter as a reference point. The claimed fixed point stabilization device serves to stabilize the fixed point. The space for defining the reference point may be a space employing a so-called generalized coordinate system. The generalized coordinates may be the relative position of the reference point to the waist of the legged mobile body within a three-dimensional physical space, for example. Alternatively, the joint angle of the knee joint of the leg, the joint angular velocity, and so on may be used. In other words, the coordinate value at a point on the trajectory denotes the quantity of state of the leg reference point. The features of the legged mobile body according to this embodiment may be expressed as follows. A legged mobile robot comprises a fixed point generator for generating a fixed point defined in relation to a closed cyclic trajectory of a reference point fixed on a leg, and a fixed point stabilizer for stabilizing the fixed point, wherein the fixed point stabilizing portion stabilizes the fixed point in accordance with a grounding position of the legged mobile body.

An embodiment of the present invention was described in detail above, but this is merely an example of the present invention, and does not limit the claims. The techniques described in the claims include various alterations and modifications of the embodiment described above as an example.

The technical elements described in the specification and drawings exhibit technical usefulness either independently or in various combinations, and are not limited to the combinations described in the claims at the time of filing. Further, the techniques cited in the specification and drawings achieve a plurality of objects simultaneously, and technical usefulness is attained simply by achieving one of these objects.

INDUSTRIAL APPLICABILITY

Legged mobile robots may be used on construction sites, in medical and nursing facilities, in general households, and so on. However, with a conventional control method that does not employ the present invention, energy efficiency is low, leading to great limits on long-term use. By employing the present invention, usage time is extended dramatically.

The present invention is capable of generating an extremely natural and stable gait and maintaining a high level of robustness. Hence, the present invention is highly likely to be of use in future robots that will serve as the key to the industrialization of coexistence with human beings.

The invention claimed is:

1. A passive walking legged robot comprising:
    two outside legs connected rotatably and coaxially to a waist;
    a central leg connected between the two outside legs rotatably and coaxially to the two outside legs; and
    a loop-shaped stopper connecting the two outside legs so as to surround the central leg, wherein the stopper keeps a relative grounding position between the outside legs and the central leg substantially constant by limiting a relative swing range between the central leg and the outside legs.

2. The passive walking legged robot according to claim 1, wherein, each of the legs has an upper leg portion and a lower leg portion that rotate relatively via a knee joint, and
    the stopper connects said lower leg portions of the two outside legs, and limits the relative swing range between the central leg and the outside legs by contacting the lower leg portion of the central leg while the legs swinging.

* * * * *